US006873150B2

United States Patent
Buerger et al.

(10) Patent No.: US 6,873,150 B2
(45) Date of Patent: Mar. 29, 2005

(54) POSITION SENSOR

(75) Inventors: Frank Buerger, Dueren (DE); Norbert Ludwig, Brueggen (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 10/231,625

(22) Filed: Aug. 30, 2002

(65) Prior Publication Data

US 2003/0042891 A1 Mar. 6, 2003

(30) Foreign Application Priority Data

Sep. 4, 2001 (DE) .......................................... 101 43 398

(51) Int. Cl.[7] .............................. G01B 7/30; G01R 33/06
(52) U.S. Cl. ................................ 324/207.2; 324/207.25
(58) Field of Search .......................... 324/207.2, 207.21, 324/207.25, 174; 338/32 R, 32 H

(56) References Cited

U.S. PATENT DOCUMENTS 6,194,893 B1 * 2/2001 Yokotani et al. ........ 324/207.21

6,400,141 B1   6/2002 Apel et al.

FOREIGN PATENT DOCUMENTS

DE    199 03 490 C2    3/2001
EP         1111343    *  6/2001

* cited by examiner

*Primary Examiner*—Jay Patidar
(74) *Attorney, Agent, or Firm*—Ohlandt, Greeley, Ruggiero & Perle LLP

(57) ABSTRACT

A position sensor which is particularly suitable for the rotational angle detection of throttle or exhaust gas valves comprises a permanent magnet and at least two magnetic field sensors arranged adjacently to the permanent magnet. The magnetic field sensors are, for example, Hall sensors. By a relative movement between the permanent magnet and the magnetic field sensors, a position-dependent signal, for example in dependence on a rotational angle of the shaft, is produced. According to the invention, the two magnetic field sensors are arranged behind each other in field direction of the permanent magnet.

8 Claims, 2 Drawing Sheets

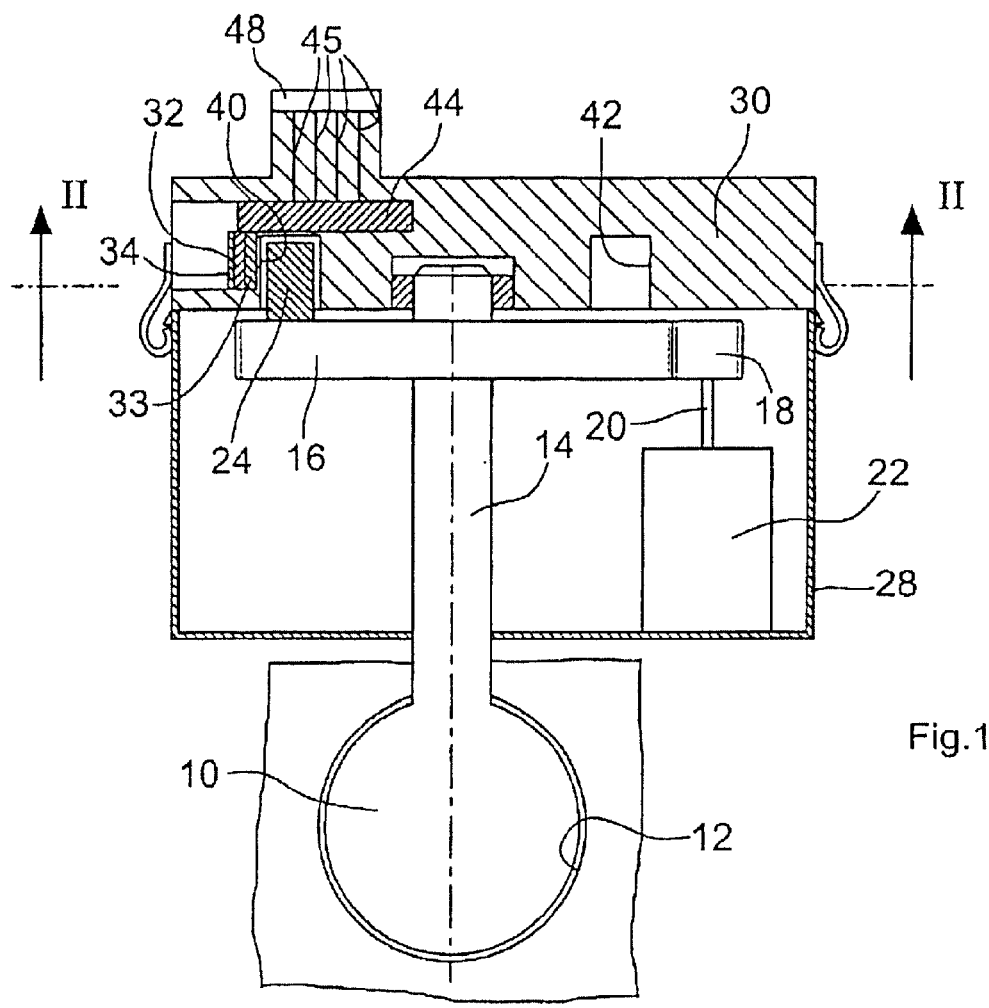
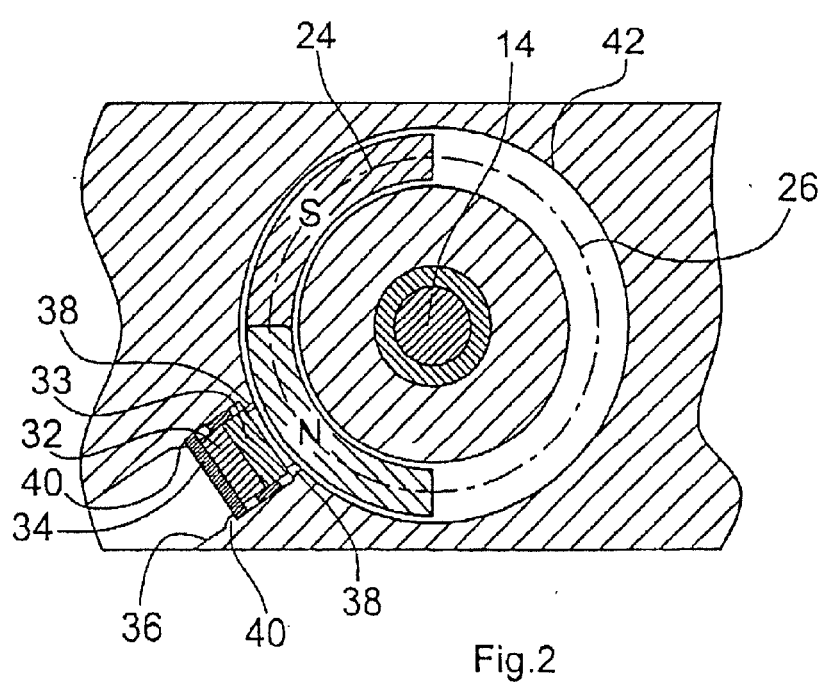
Fig.1
Fig.2

POSITION SENSOR

BACKGROUND OF THE INVENTION

The invention relates to a position sensor, particularly a position sensor for the rotational angle detection. Particularly, the invention relates to a position sensor for the rotational angle detection of throttle valves or exhaust gas valves in exhaust gas recirculation systems.

TECHNICAL FIELD

A device for determining the rotational angle, i.e., the aperture angle of a throttle valve, is described in German Patent DE 199 03 490. The throttle valve is connected with a pivot shaft and, via several intermediate elements, with a ring magnet arranged concentrically to the pivot shaft. Thus, the ring magnet is co-rotated when the throttle valve is pivoted. Two magnetic field sensors, such as Hall sensors, for example, are arranged in a housing lid. The two sensors are arranged outside the ring magnet so as to be offset by 180° with respect to each other. The two sensors produce two angle-dependent signals. The two field development curves produced by the sensors are substantially sinusoidal, the curves being substantially linear in an angular range of ±45°. A large building room is required to provide a ring magnet with two sensors arranged outside the ring magnet. This is particularly disadvantageous in the rotational angle detection of throttle and exhaust gas valves since they are arranged in a region of the engine wherein there is not much space.

SUMMARY OF THE INVENTION

It is the object of the invention to provide a position sensor, particularly for the rotational angle detection for throttle and exhaust gas valves, which requires not much space.

The position sensor according to the invention, which is particularly suitable for the rotational angle detection of throttle or exhaust gas valves, comprises a permanent magnet and at least two magnetic field sensors, such as Hall sensors, for example, arranged adjacently to the permanent magnet. Through a relative movement between the permanent magnet and the magnetic field sensors, a signal is produced by which the position of the magnet relative to the sensors can be determined. By providing two sensors, redundant signals can be produced so that a position signal is reliably produced even if one of the two sensors fails. According to the invention, the two magnetic field sensors are arranged behind each other in the field direction of the permanent magnet. If an annular magnet is used as permanent magnet, as is typical with position sensors for the rotational angle detection, the two magnetic field sensors are preferably arranged on a radial line of the annular permanent magnet within or without the permanent magnet.

Due to the fact that, according to the invention, the two magnetic field sensors are arranged behind each other, less space is required. Because of the arrangement of the two magnetic field sensors according to the invention, it is particularly possible to provide only a segment of an annular magnet, particularly a semicircular or half-round annular magnet, instead of an annular magnet for the rotational angle detection. Thereby, the costs are additionally reduced.

An essential advantage of arranging two magnetic field sensors in the manner according to the invention is that the same magnetic field flows through both sensors. Thus, the two sensors are excited by the same or almost the same magnetic field. As a consequence, the signals supplied by the two sensors present no variations to be considered due to different field courses. Both sensors, for example, detect a defect in the magnet. Thus, it can be detected in high probability that a defect has occurred in the magnet and not in the sensor. In case of a defect occurring in the magnet, it cannot be told straight away with mutually spaced sensors whether the defect has occurred in the magnet or in the sensor. It is extremely improbable that both sensors arranged behind each other have the same defect.

Preferably, the two magnetic field sensors are connected with a common flux density amplifier. Particularly, the flux density amplifier may be an iron lamina. The flux density amplifier is preferably arranged such that the number of field lines extending through the magnetic field sensors is increased.

In order to particularly facilitate the installation of the magnetic field sensors, the two magnetic field sensors are fixedly connected with each other, particularly glued together. To glue the two magnetic field sensors together has the additional advantage that the positions of the magnetic field sensors with respect to each other are defined. Preferably, the common flux density amplifier is also fixedly connected, particularly glued, with at least one of the two magnetic field sensors.

The arrangement of the two sensors arranged behind each other according to the invention satisfies the function of the OBD II (on-board diagnosis II). By arranging the sensors according to the invention, a defect of the one or the other sensor or the magnet can be well differentiated in particular. Further, the costs of the device according to the invention are lower.

Preferably, the magnet used is a diametrically magnetized magnet. Preferably, a magnet is used as is described in the unpublished German Patent DE 100 60 486.

BRIEF DESCRIPTION OF THE DRAWINGS

Hereinafter, a preferred embodiment of the invention is described in detail with reference to the accompanying drawings, in which:

FIG. 1 is a schematic sectional view of a preferred embodiment of the invention, FIG. 2 is a schematic sectional view along the line II—II in FIG. 1.

DETAILED DESCRIPTION OF THE FIGURES

Figure 3:
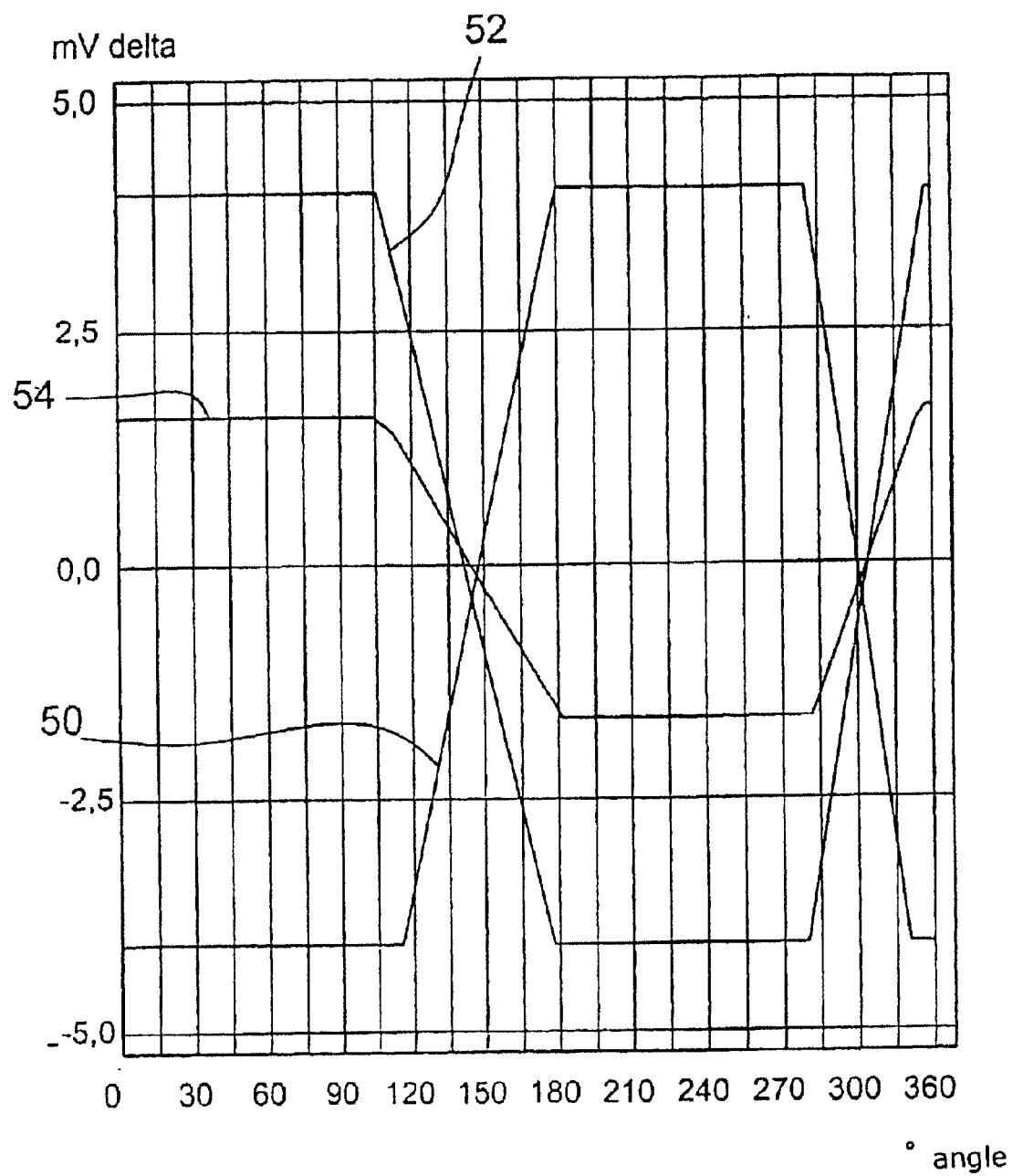
FIG. 3 is a diagram of the two sensor signals of the magnetic field sensors.

In FIGS. 1 and 2, the device for the rotational angle detection according to the invention is connected with a throttle or exhaust gas valve 10. The valve 10 is arranged in a channel 12 and adapted to be pivoted by a pivot shaft 14. The pivot shaft 14 is connected with a toothed gear 16 into which a pinion 18 engages. Via a shaft 20, the pinion 18 is connected with a drive means 22. By actuating the drive means 22, the position of the valve 10 in the channel 12 can thus be changed. Thereby, the flow rate through the channel 12 is variable.

In order to detect the rotational angle of the valve 10 or the pivot shaft 14, the toothed gear 16 is connected with a semicircular magnet 24. The magnet 24 is arranged on a circular line 26 concentric to the pivot shaft 14.

The drive means 22, the pivot shaft 14 as well as the toothed gear 16 and the pinion 18 are arranged in a housing 28. The housing 28 can be closed by a lid 30. Within the lid 30 preferably made of plastics, two magnetic field sensors 32,33, such as Hall sensors, for example, are arranged behind each other. Both sensors are configured as non-contact sensors and can be completely incorporated in plastics.

In the illustrated embodiment, the two magnetic field sensors 32,33 are arranged on the same side of the magnet 24 outside the magnet 24 and preferably glued together at their contact surfaces. A flux density amplifier 34 is provided to amplify the magnetic field lines. Preferably, a metal plate fixedly connected with the magnetic field sensor 32 is provided as flux density amplifier 34. Thus, the two magnetic field sensors 32,33 are arranged between the flux density amplifier 34 and the magnet 24.

In the lid 30 serving as a part of a housing of the position sensor according to the invention, a receiving opening 36 is provided to receive the magnetic field sensors 32,33 as well as the flux density amplifier 34. The receiving opening 36 comprises an opening pointing outwards, so that the two magnetic field sensors 32,33 in the illustrated embodiment, together with the flux density amplifier 34, can be inserted into the receiving opening from outside. The receiving opening 36, which has a rectangular cross section, for example, comprises two stops 38 to fix the unit of the two sensors 32,33 and the amplifier 34. The stops 38 may also be a circumferential frame-like stop. Additionally, the unit of the two sensors 32,33 and the amplifier 34 is fixed by catch elements 40 arranged in the receiving opening 36. In the illustrated embodiment, the catch elements 40 are elastically resilient catch noses pressed outwards into the lid when the unit 32,33,34 is inserted and snap back into their original position when the unit 32,33,34 is in its illustrated position.

In the installed state, the magnet 24 projects into a circular ring-shaped annular opening 42 provided in the lid 30.

In the illustrated embodiment, the two sensors 32,33 are connected with a board 44 incorporated in the plastic lid 30. The board 44 is connected with a plug contact 48 via lines 45.

Instead of a board 44 cast in the lid 30, the lines 45 can also be directly connected with the sensors 32,33 and led out of the receiving opening 36.

The two sensors 32,33 produce the signals 50 and 52, respectively, illustrated in FIG. 3. The two illustrated curves, for example, are substantially linearly falling or rising within a range of from 110° to 180°. Within this range, an angle detection can thus be performed by one of the two sensors 32,33. Even if one of the two sensors 32,33 fails, an angle detection is still possible. With the preferred use of the device according to the invention for the rotational angle detection of throttle or exhaust gas valves, this angular range is sufficient by far.

The curve 54 shows the synchronism deviation of the two sensors 32,33 in %.

It is essential for the invention that a sensor block or the like, which may be provided in the form of a black box, produces two output signals having substantially the signal course as illustrated in FIG. 3. Then, a double sensor as described above, i.e. two sensors, is preferably provided in this black box.

What is claimed is:

1. A position sensor comprising:
   a permanent magnet that is at least partially annular;
   at least two magnetic field sensors arranged adjacently to said permanent magnet, outside a circumference of said permanent magnet, and on a radial line of said permanent magnet; and
   a position-dependent signal being produced by a relative movement between said permanent magnet and said magnetic field sensors, wherein said magnetic field sensors are arranged behind each other in field direction of said permanent magnet.

2. The position sensor according to claim 1, wherein said magnetic field sensors are connected with a common flux density amplifier.

3. The position sensor according to claim 2, wherein said magnetic field sensors are arranged between said flux density amplifier and said permanent magnet.

4. The position sensor according to claim 2, wherein said flux density amplifier is fixedly connected with one of said magnetic field sensors.

5. The position sensor according to claim 2, further comprising a housing, wherein said housing comprises a receiving opening for receiving said magnetic field sensors and said flux density amplifier, and wherein said receiving opening comprises an opening pointing outwards for inserting said magnetic field sensors and said flux density amplifier.

6. The position sensor according to claim 5, wherein said receiving opening further comprises catch elements for fixing the position of said magnetic field sensors and said flux density amplifier.

7. The position sensor according to claim 5, wherein said receiving opening is arranged in said field direction of said permanent magnet.

8. The position sensor according to claim 1, wherein said magnetic field sensors are fixedly connected with each other.

* * * * *